May 27, 1958 — I. J. WHITE ET AL — 2,836,419
RACE TRACKS
Filed Oct. 20, 1955 — 3 Sheets-Sheet 1

INVENTOR.
IVAN J. WHITE
CHARLES S. HARRIMAN
BY Kimmel & Crowell
ATTORNEYS

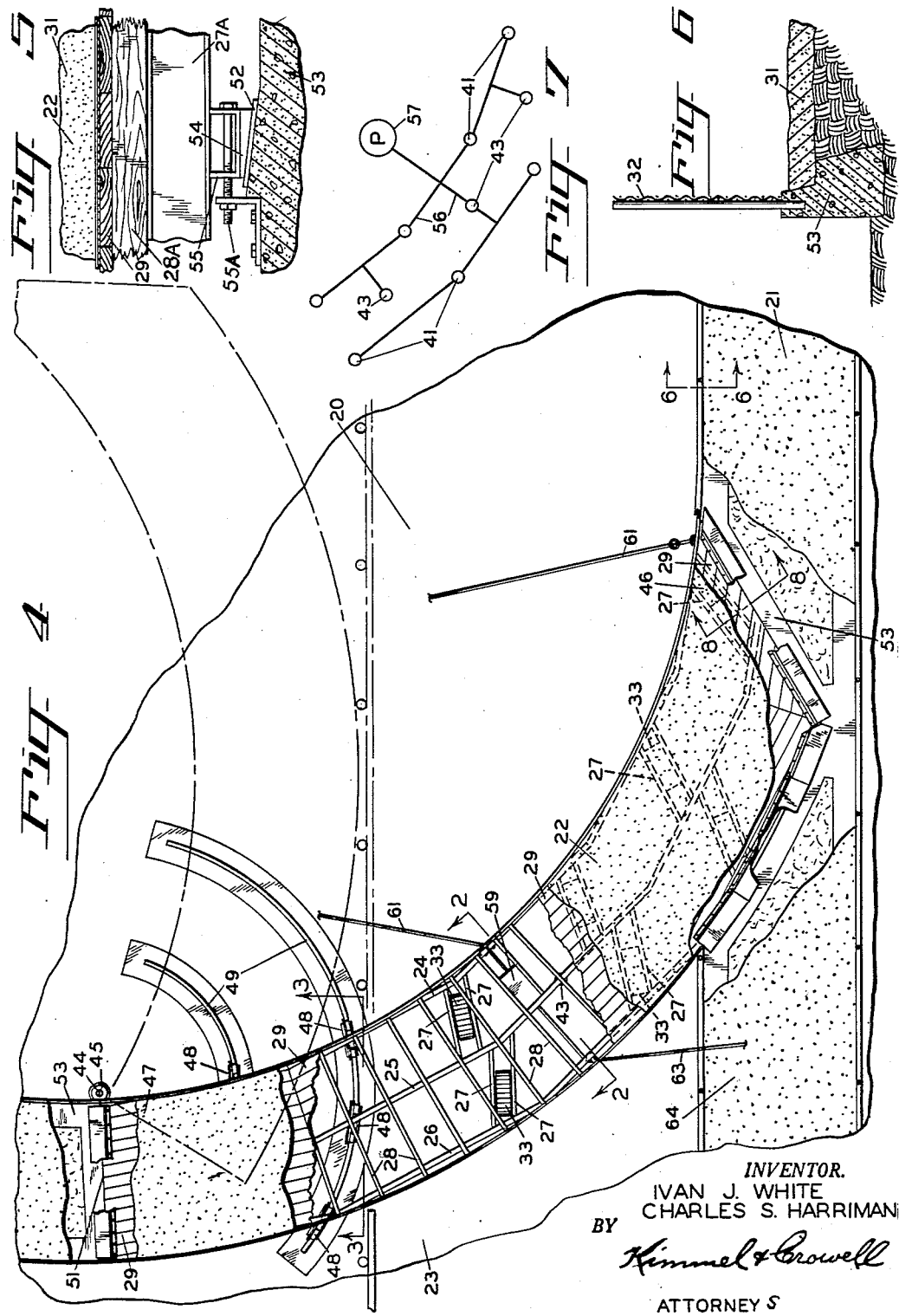

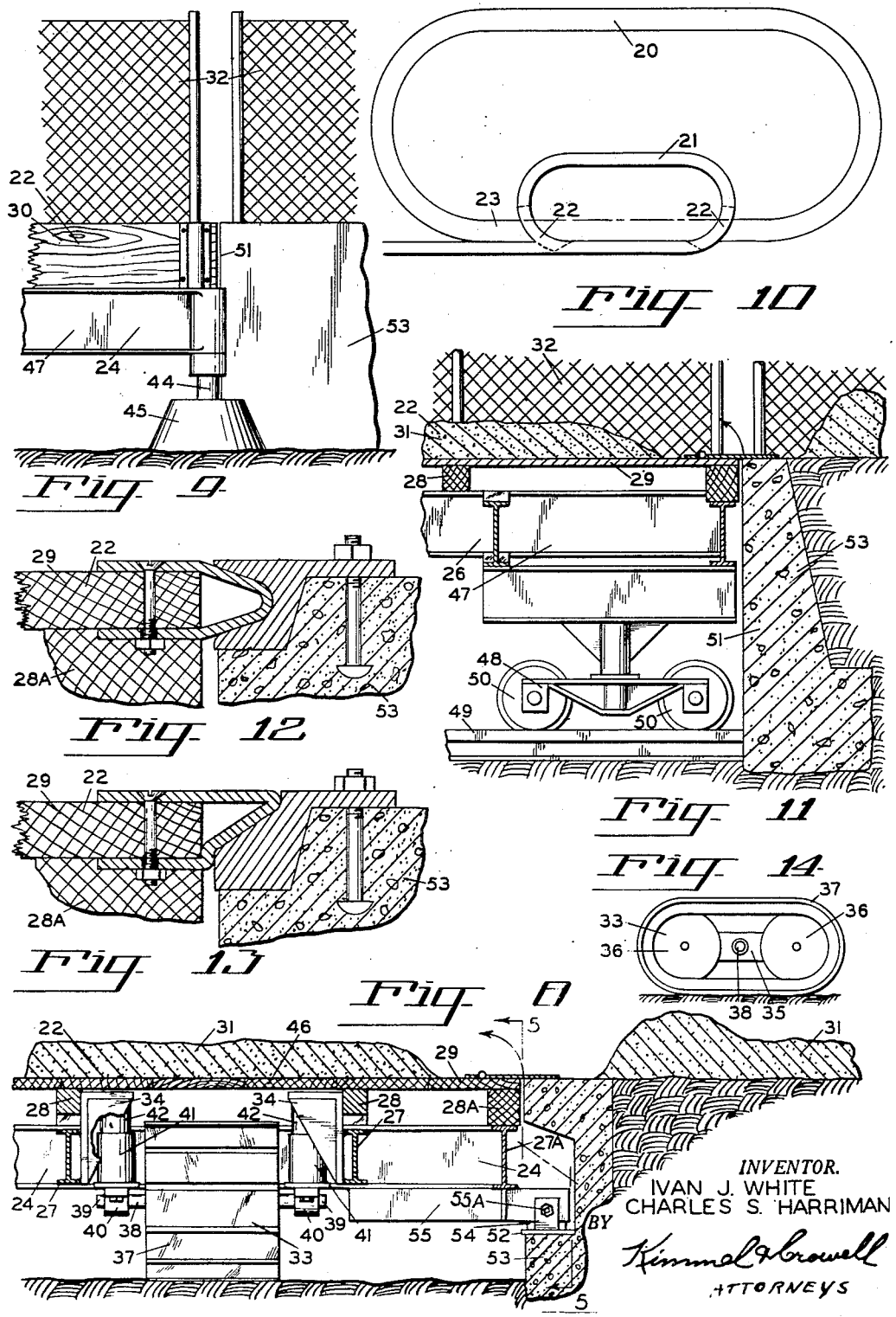

United States Patent Office 2,836,419
Patented May 27, 1958

2,836,419

RACE TRACKS

Ivan J. White, Portland, Oreg., and Charles S. Harriman, Auburn, Wash.

Application October 20, 1955, Serial No. 541,730

1 Claim. (Cl. 272—5)

This invention relates to improvements in race tracks and is particularly adapted to be used in connection with combination horse and dog tracks of the type disclosed in our copending application, Serial No. 389,330, filed October 30, 1953, now Patent No. 2,757,930.

The primary object of the invention is to devise a moving platform for permitting the alternate use of a dog track on any established race course.

Another object of this invention is to devise a platform to be supported upon track laying type trucks for the specific purpose of preventing undulation.

A further object of this invention is to provide means for levelling the platform on its supporting trucks equally over its entire surface and slightly supporting the same in such a manner as to prevent any undulation.

A still further object of this invention is the provision of means for aligning the platform with the level of the dog track when brought into operating position for use as a dog track.

These and other incidental objects will be apparent in the drawings, specification and claim.

Referring to the drawings:

Figure 4 is an enlarged fragmentary plan view showing the platform in operating position, with parts broken away for convenience of illustration;

Figure 5 is a fragmentary transverse cross-section, taken on line 5—5 of Figure 8, looking in the direction of the arrows;

Figure 6 is a fragmentary transverse cross-section, taken on line 6—6 of Figure 4, looking in the direction of the arrows;

Figure 7 is a diagrammatical layout of the hydraulic levelling jacks and pump used in connection with the trucks and ground surface;

Figure 8 is a fragmentary transverse cross-section, taken on line 8—8 of Figure 4, looking in the direction of the arrows;

Figure 9 is an enlarged fragmentary side elevation of the platform hinge connection to the dog track at its pivot end;

Figure 10 is a diagrammatical plan view of the horse race track, having the dog track superimposed thereupon showing the dog track platforms closed for operation;

Figure 11 is an enlarged lateral fragmentary cross-section, taken on line 11—11 of Figure 1, looking in the direction of the arrows;

Figure 12 is an enlarged fragmentary vertical cross-section of the platform interlocked with the permanent sections of the track;

Figure 13 is a view similar to Figure 12, illustrating a modified form of interlock, and Figure 14 is a diagrammatical side elevation of one of the supporting track laying trucks.

Figures 1, 2, 3:
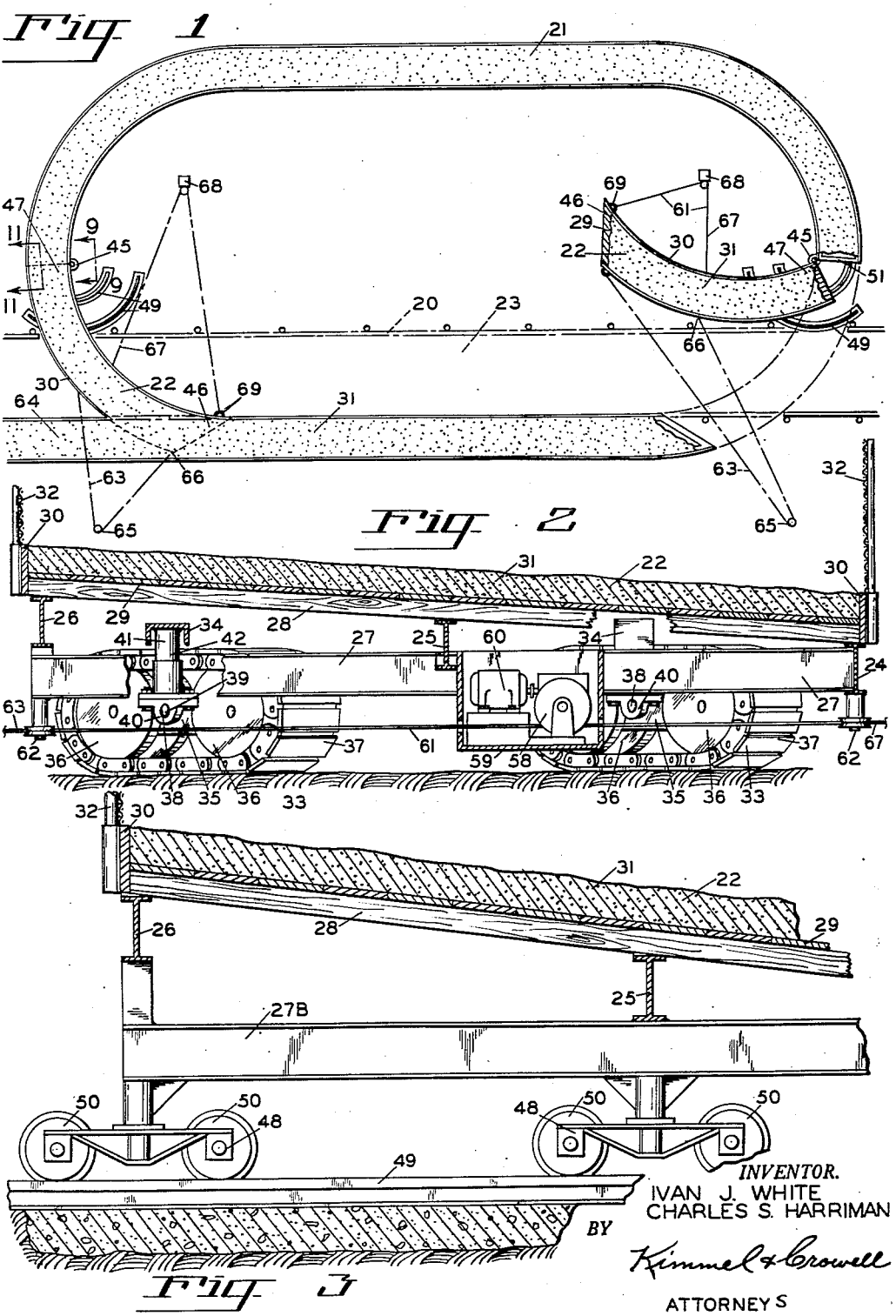
Figure 1 is a fragmentary plan view of a horse race track having a dog track including platforms superimposed thereupon, one of said platforms being shown positioned over the horse race track and the other removed.
Figure 2 is an enlarged transverse cross-section of the platform, taken on line 2—2 of Figure 4, looking in the direction of the arrows.
Figure 3 is a fragmentary enlarged transverse cross-section, taken through the platform on line 3—3 of Figure 4, looking in the direction of the arrows.

Referring to Figure 10, a conventional horse race track is indicated by numeral 20, illustrating how a dog track 21 can be superimposed over this race track 20. When the dog track 21 is in use, platforms 22 are brought into place over the straight-run 23 of the race track 20.

Referring particularly to Figures 1, 2, 3, 4 and 8, the preferred structure of the platform 22 is best illustrated. This platform 22 consists of parallelly spaced beams 24, 25 and 26 mounted upon transversely spaced beams 27, as best illustrated in Figure 2.

Transversely supported upon the beams 24, 25 and 26 are transverse joists 28, having decking 29 fixedly secured thereon in the usual manner. Rails 30 are associated with the decking 29 and confines the racing surface 31. Extending upwardly from these rails 30 are fences 32. The transverse beams 27 are mounted upon trucks 33 by way of brackets 34. The brackets 34 are fixedly mounted to the cross beams 27, as best illustrated in Figures 2 and 8.

The trucks 33 consist of frames 35, having the usual wheels 36 journalled thereto and adapted to have the endless tracks 37 trained thereabout. A shaft 38 is journalled or clamped within the frame 35 extending transversely on either side of the trucks 33. The outer ends 39 of the shaft 38 is either fixedly mounted or journalled within fitting 40. The fitting 40 is fixedly secured to the lower ends of the hydraulic cylinder 41 while the piston 42 of the cylinder 41 is fixedly secured to the brackets 34. Other hydraulic cylinders are disposed at desired locations between the truck units, as indicated at 43, the object of which will be described later on.

The platforms 22 are hingedly secured to the vertical pillar 44 at one end. This pillar 44 is fixedly mounted within a solid base 45. The opposite end of the platforms 22 are formed as best illustrated in Figure 4, their ends 46 running at an angle to the center line of the platform 22, the object of which is to allow the platform 22 to be opened and closed in reference to the dog track 21.

The pivot ends 47 are supported upon trucks 48, referring to Figures 3, 4 and 11, which operate on the rails 49. These trucks 48 and rails 49 can be used at this point because at this location they avoid the race track 20.

The trucks 48 have the usual flanged wheels 50 for operating on the rails 49. The ends 47 of the platform can abut squarely against the ends 51 of the track 21, or they may have an interconnection, as indicated in Figures 11, 12 or 13.

Referring to Figure 5, sloping pads 52 are supported upon the foundation 53 of the track 21 and are adapted to cooperate with the sloping undersurface 54 secured to the beams 55. The beams 55 are welded to the underside of the beam 27 and the end bar 27A of the platform 22, as best illustrated in Figure 8, so that when the platform 22 comes into place it will be raised to a predetermined level. A bolt 55A may be brought into action for locking the end of the platform 22 in its position for the dog track 21 to be used.

Referring to Figure 7, a diagrammatical layout of the jacks 41 and 43 are shown connected together by the pipes 56. A hydraulic supply pump 57 is connected to these pipes 56 so that when the platform 22 is brought into operating position hydraulic pressure can be applied to these various jacks 41 and 43, bringing a pressure under the platform 22 that is equal throughout its entire area, both against the trucks 48 and against the ground surface preventing any undulation in the operation of the track 21. This also completely levels the entire area of the platform 22.

A preferred method of moving the platform 22 in or out of position in regards to the dog track 21 is illustrated in the drawings, consisting of cable drums 58 mounted upon a supporting bracket 59 to the platform 22 and being driven by the motor 60. A cable 61 is wound about the drums 58 in the usual manner and trained about the idlers 62, which are fixedly mounted to the platform 22.

One end of the cable 63 passes under the ramp 54 of the dog track 21 beyond to the fair-lead 65 back to the platform 22 and deadended at 66. The opposite end 67 of the cable 63 is extended to the fair-lead 68 within the track 21 and dead-ended at 69 to the platform 22. Referring to Figure 1, this type of mounting for the cable 63 gives a positive straight-on right angle pull to the platform 22 about its pivot point 44 when bringing the platform 22 into operating position, and it gives a straight-on pull about its pivot point 44 while bringing the platform 22 into open position, as illustrated best in Figure 1.

We will now describe the operation of our new and improved horse race tracks 20. When it is desired to use the proved platform 22 for dog tracks in connection with dog track 21, the platforms 22 are moved by the above-described cable 63 and hoisting machine to the position shown on the left of the drawing, Figure 1, corresponding to the position also shown in Figures 1, 4 and 10. In Figure 1, the platform 22 is shown in open position or inoperative position, moved thereto by the above-described hoist and cable 63 arrangement.

When the platform 22 is brought into the operating position, referring to Figure 6, the sloping surfaces 54 of the beams 55 lead up on the sloping pads 52 of the foundation 53 of the tracks 21 levelling the ends 46 of the platforms 22 of the track, after which the bolt 55A is inserted through the beam 55 and a bracket forming part of the foundation, locking the platform 22 in this position. It may not be necessary to lock the platform 22 by this bolt 55A, as it may stay in position without so doing. After the platform 22 is brought into position, hydraulic pressure is pumped from the pump 57, referring to Figure 7, into the pipe line 56 and to the hydraulic cylinders 41 and 43 levelling the entire area of the platform 22 and supporting the same through the hydraulic fluid on to the track laying trucks 33, preventing any undulation being developed while the track 21 is being used.

Having thus described the preferred embodiments of the invention, it should be understood that numerous modifications and structural adaptations may be resorted to without departing from the scope of the appended claim.

What is claimed is:

In a race course including primary and secondary race tracks positioned in vertically separated planes with portions of said secondary track overlying said primary track when said secondary track is in operative position, means for operatively connecting said secondary track over said primary track comprising a pair of generally horizontal platforms, means mounting one end of each of said platforms for pivotal movement into and out of bridging relation to said primary track, a plurality of track-laying trucks positioned beneath each of said platform remote from said one end of said platforms, hydraulic means supporting said platforms on said respective trucks for vertical adjustment thereon for leveling said platforms with relation to said secondary track, and means including a motor wound cable for moving each of said platforms about their respective pivots.

References Cited in the file of this patent

UNITED STATES PATENTS

| | | |
|---|---|---|
| 851,144 | Biron | Apr. 23, 1907 |
| 1,683,407 | Penn | Sept. 4, 1928 |
| 1,866,613 | Auryansen | July 12, 1932 |
| 2,650,826 | Alessio | Sept. 1, 1953 |
| 2,757,930 | White et al. | Aug. 7, 1956 |